United States Patent
Schlenz et al.

(10) Patent No.: US 6,473,285 B1
(45) Date of Patent: Oct. 29, 2002

(54) SURGE-GAP END PLUG

(75) Inventors: Alan J. Schlenz, Snellville, GA (US); David Wallis, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 232 days.

(21) Appl. No.: 09/660,653

(22) Filed: Sep. 13, 2000

(51) Int. Cl.⁷ ................................................. H02H 7/20
(52) U.S. Cl. ...................................................... 361/112
(58) Field of Search ................................ 361/111, 112, 361/117, 118, 119

(56) References Cited

U.S. PATENT DOCUMENTS

| | | | |
|---|---|---|---|
| 3,798,498 A | | 3/1974 | Yamada et al. |
| 3,912,965 A | | 10/1975 | Yamada et al. |
| 4,293,887 A | * | 10/1981 | Splitt et al. .................. 361/120 |
| 4,317,155 A | * | 2/1982 | Harada et al. .............. 361/120 |
| 4,345,295 A | * | 8/1982 | Hasse et al. ................. 361/130 |
| 5,210,676 A | * | 5/1993 | Mashikian ................... 361/117 |
| 5,216,569 A | * | 6/1993 | Brookhiser ................. 361/107 |
| 5,373,413 A | * | 12/1994 | Shannon et al. ............ 361/119 |
| 5,523,916 A | * | 6/1996 | Kaczmarek ................. 361/119 |
| 5,963,413 A | | 10/1999 | Zahlmann et al. |
| 5,969,924 A | | 10/1999 | Noble |

OTHER PUBLICATIONS

IEEE Power Engineering Society, "IEEE Recommended Practice on Surge Voltages in Low–Voltage AC Power Circuits," IEEE C62.41–1991, Oct. 11, 1991.

* cited by examiner

Primary Examiner—Adolf Deneke Berhane
(74) Attorney, Agent, or Firm—Hubert J. Barnhardt, III; Kenneth M. Massaroni; Shelley L. Couturier

(57) ABSTRACT

A surge-gap device (300) includes two electrodes (310, 315), having an inside portion and an outside portion, and an insulator material (320), which secures the two electrodes (310, 315). The insulator material (320) has an opening through the material to expose an open-air gap (325) that is defined by the space between the two inside portions of the electrodes (310, 315). In cases of a voltage surge, the surge-gap device permits an arc to pass between the proximate inside portions of the electrodes (310, 315) across the open-air gap (325), which gives a current surge a low impedance path to ground. Also included is a fastener (305) for electrically coupling the surge-gap device (300) to a ground plane (220) of an external electrical device (300) for suppressing the voltage and current surges.

18 Claims, 4 Drawing Sheets

SURGE-GAP END PLUG

FIELD OF THE INVENTION

This invention relates generally to cable television systems, and more specifically to taps, which are used in such systems.

BACKGROUND OF THE INVENTION

A communication system 100, such as a two-way cable television system, is depicted in FIG. 1. The communication system 100 includes headend equipment 105 for generating forward signals that are transmitted in the forward, or downstream, direction along a communication medium, such as a fiber optic cable 110, to an optical node 115 that converts optical signals to radio frequency (RF) signals. The RF signals are further transmitted along another communication medium, such as coaxial cable 120, and are amplified, as necessary, by one or more distribution amplifiers 125 positioned along the communication medium. Taps 130 included in the cable television system split off portions of the forward signals for provision to subscriber equipment 135, such as set top terminals, computers, and televisions. In a two-way system, the subscriber equipment 135 can also generate reverse signals that are transmitted upstream, amplified by any distribution amplifiers 125, converted to optical signals, and provided to the headend equipment 105.

A cable television tap 130 that splits the forward signal is depicted in FIG. 2. The tap 130 includes an input port 205 for receiving the signal, an output port 210 for passing the signal through to other portions of the communication system 100, and subscriber ports 215, each of which couples a portion of the signal to a subscriber. A tap 130 commonly includes four, eight, or sixteen subscriber ports 215, although an even larger number of subscriber ports 215 can be included if necessary. There are also access ports 225 on the tap housing 220 for cable television system technicians to access seizure screws 230. The seizure screws 230 are a mechanical connection and an electrical conductor between a center conductor of the coaxial cable to a printed circuit board of the tap 130. Depending on installation of the tap 130, the input and output ports can be interchanged with the relative access ports 225.

The design specifications on the distribution taps should meet the IEEE standard (587), which refers to the specification of a combination surge that a product should be designed and rated to meet or exceed. More specifically, the taps should withstand 6 kilovolts (kV) of peak voltage and 3 kiloamps (kA) of peak current for a specified amount of time. The conventional tap circuitry is not rated to withstand a combination surge equal to, or in excess of, this IEEE standard, which could, potentially, result in product failure and loss of signal to the next device in the communication system 100 if a voltage equals or exceeds this standard.

One example of a combination surge that affects the tap in a cable television system is a voltage surge along a power company's transmission power lines. The cable television systems typically utilize power company's transmission poles for hanging the communication medium, e.g., coaxial cable, on which the taps will be spliced. Alongside the cable television system coaxial cable is generally a high voltage wire that transmits power supplied by the power company to consumers. Generally, the cable television systems lease these lines from the power company; therefore, prudence suggests that the power company's rules and regulations should be followed. One regulation that the cable television service providers should practice is a grounding procedure of the communication system 100 onto the power company's transmission ground.

One disadvantage of this practice is the power company grounding may not be adequate enough to protect the cable television system's devices. A sudden voltage surge throughout the transmission power lines to a transmission ground may, as a result of poor grounding, travel into the communication medium of the cable television system 100. This voltage surge causes a spike in current, which may potentially exceed the component ratings of the surrounding taps, resulting in failure of the tap or a disruption of service to the consumer of the cable television system 100.

Another example of a combination surge is a lightning strike that causes a voltage spike on the communication medium of the cable television system 100. A lightning strike may occur anywhere throughout the communication system 100; therefore, if there is not adequate protection for the electrical and passive devices, e.g., taps 130, this surge in power may affect the circuitry in the surrounding equipment.

In light of some of the disadvantages associated with power surges throughout a cable television system 100 and the more recent expectation of meeting the IEEE standard (587), there is an increasing expectation of cable service providers that the design and performance of products, e.g., distribution taps, will be reliable and surge-resistant. It is also important that any such features be easily retrofitted into existing products with an ease of installation to keep upgrade costs at a minimum. Thus, what is needed is a protective device for the distribution taps that will limit the combination voltage and current surges to within the ratings of the components used within the taps.

DETAILED DESCRIPTION OF A PREFERRED EMBODIMENT

Figure 1:
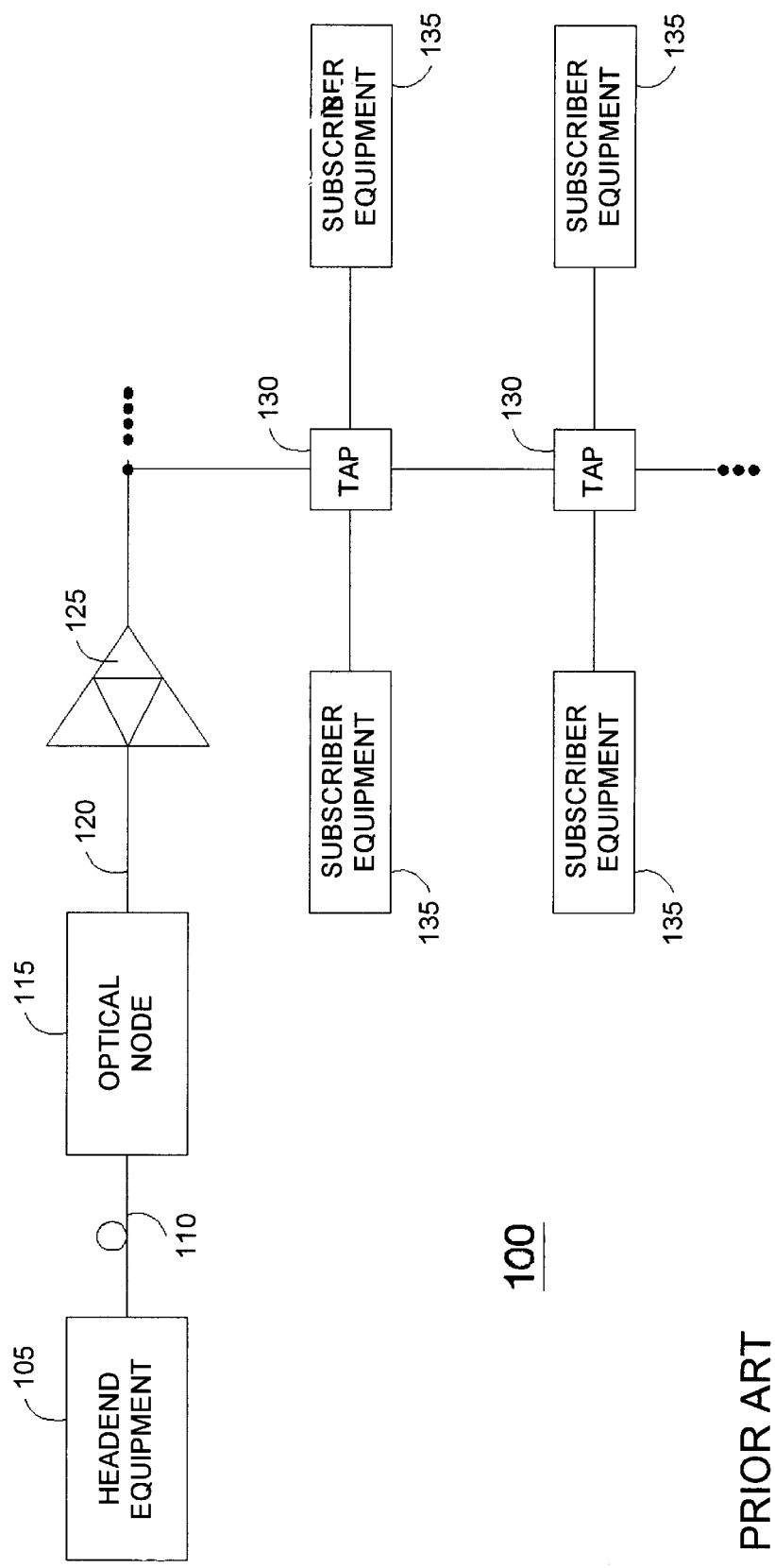
FIG. 1 is a block diagram of a conventional communication system, such as a cable television system.

As mentioned in the Background of the Invention and depicted in FIG. 1, a communication system 100 includes devices to transmit signals to remote subscribers. Distribution taps 130 are included in this communication system 100. The design specifications on the distribution taps should meet IEEE standard (587), which refers to the specifications of a combination surge in which a product should be designed and rated to meet or exceed. More specifically, the taps should withstand 6 kV of peak voltage and 3 kA of peak current for a specified amount of time. The conventional tap circuitry is currently not designed to withstand a combination surge equal to, or in excess of, this IEEE standard (587), which could potentially result in product failure or the loss of radio frequency (RF) or power signal to the next device in the communication system 100 if a voltage or current surge equals or exceeds this standard.

Combination surges, i.e., voltage and current surges, may be induced onto the communication system 100 along with the RF signals, for instance, as a result of poor grounding related to other transmission systems, e.g., the power company, or lightning strikes. Taps should withstand these surges in voltage and current without failure or interruption of service to the consumer. There are numerous ways of designing the tap circuitry to be robust and reliable. Due to the development time, component cost, and new product offering, however, a preferred method of protection would be a device that is externally mounted to an existing tap or to an existing competitor's tap.

Figure 2:
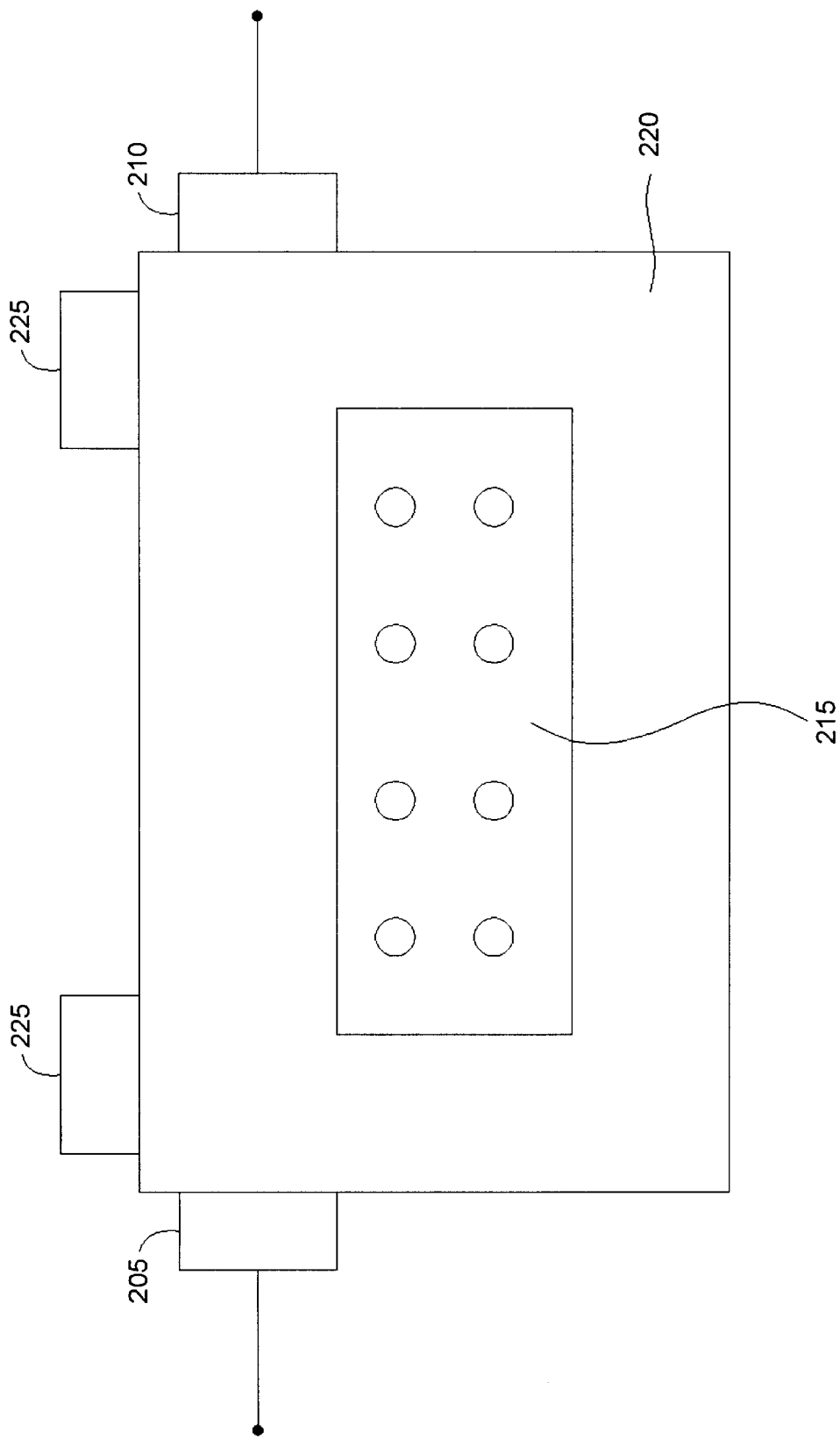
FIG. 2 is a block diagram of a conventional tap included in the communication system of FIG. 1.
Figure 3:
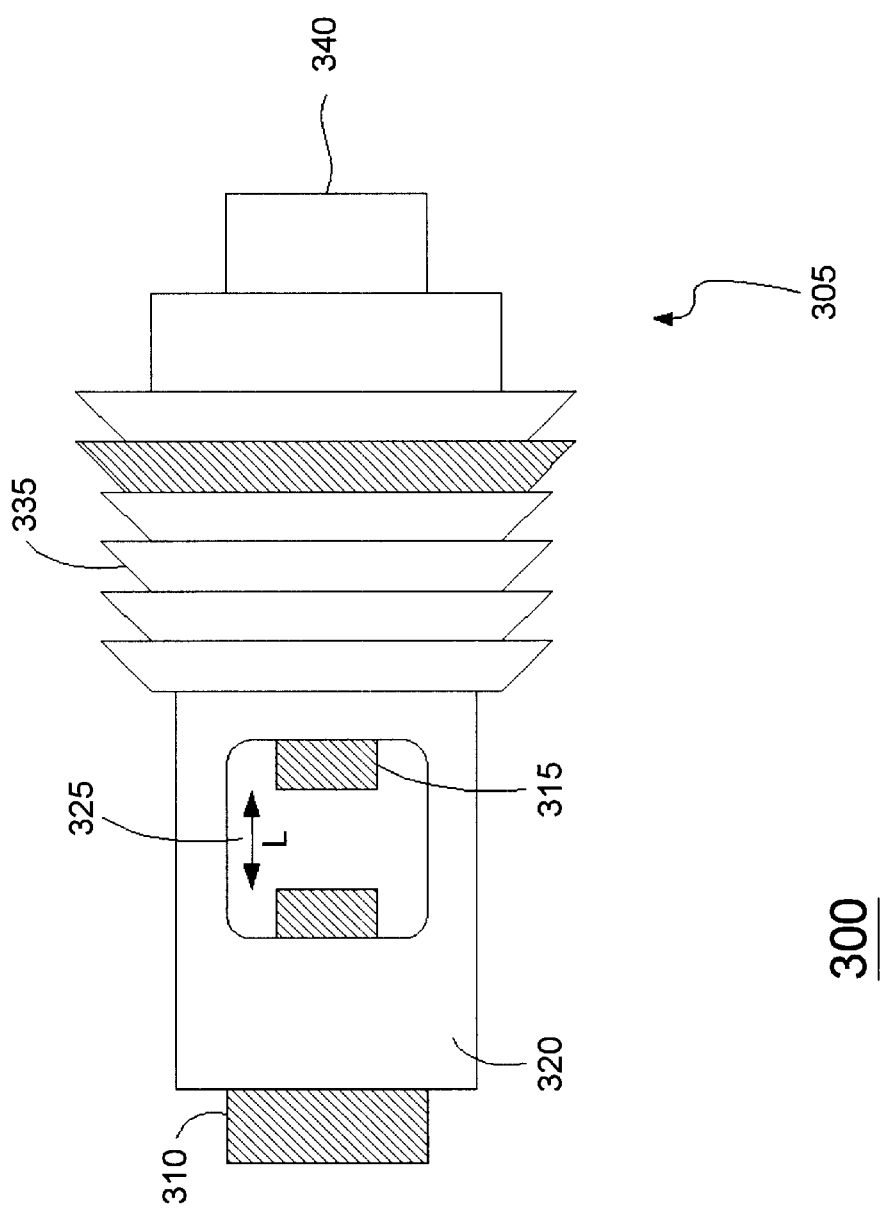
FIG. 3 is a diagram of a surge-gap end plug that can be implemented in the conventional tap of FIG. 2.

Referring to FIG. 3, a protective device, i.e., a configured surge-gap end plug 300, in accordance with the present invention, is depicted. The end plug 300 can be used in combination with a conventional tap, such as tap 130, to provide current and voltage surge protection in excess of that provided by conventional taps alone. This protective device 300 can be mounted in any one of the conventional access ports 225 (FIG. 2) of a conventional tap to provide protection from any induced combination surges.

Accordingly, a primary objective of the present invention is to provide a surge-gap device, which can be installed onto the tap housing 220 without disrupting the communication service, to limit any surge voltage and current to within the ratings of the components that are utilized in the tap circuitry. It will be appreciated that the surge-gap end plug 300, depending upon the design of the circuitry in the tap, can be mounted in just one of the available access ports 225 or mounted in all of the access ports 225. The surge-gap end plug 300 can be externally connected into the access port 225 by way of a threaded connector 305; therefore, the advantage of this surge-gap end plug 300 is that it can be easily, conveniently, and inexpensively installed into existing taps 130 that are mounted on the coaxial cable. This device 300 can be coupled to any existing tap, regardless of manufacturer, so long as the threading on the tap port corresponds to threading of the end plug 300.

Figure 4:
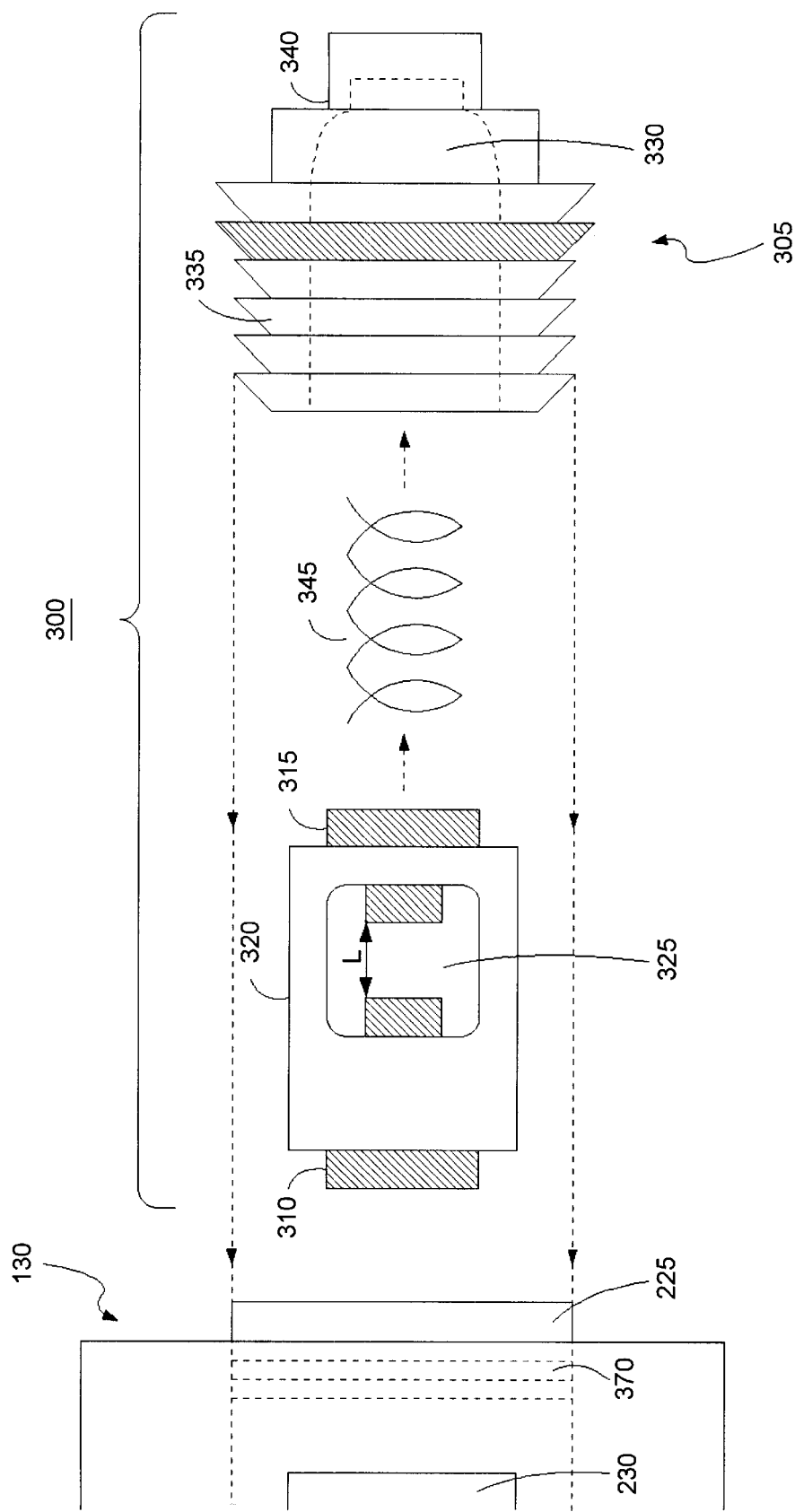
FIG. 4 is a diagram of the components depicting the assembly of the surge-gap end plug of FIG. 3 in accordance with the present invention.

Referring to FIG. 3 in conjunction with FIG. 4, the surge-gap end plug 300 includes two electrodes 310, 315, which can be made from any conductive material such as metal or carbon, that are surrounded by an insulator material 320. Referring specifically to FIG. 4, the electrodes 310, 315 each have an outside portion having a larger diameter than the opposing end, or inside portion, of each electrode 310, 315. The outside portions of the electrodes 310, 315 have a maximum diameter that extends from the insulator material 320 in the form of a connection point with the seizure screw 230. The opposing end, or inside portion, of each of the electrodes 310, 315 extends into an open-air gap 325 of the insulator material 320 and has a diameter such that it is large enough to carry excess current, but small enough to minimize the capacitance that is inherent across the open-air gap 325. The length of the electrode is minimized in relation to the diameters to keep the effective series inductance to a minimum, which results in a minimum impact on the return loss and the insertion loss of the tap 130. It will be appreciated that there are tolerances within the design to change any of the dimension while still having the capacity to shunt kiloamp surges of millisecond duration to ground without damage to the protective device 300 or the tap 130 circuitry.

The insulator material 320, which may be made of plastic or porcelain, e.g., teflon or ceramic, partially covers, electrically insulates, and at the same time mechanically secures the electrodes 310, 315. The open-air gap 325 of the insulator material 320 secures and separates the inside portions of the electrodes 310, 315 which are centered about the same longitudinal axis, and the electrodes 310, 315 are secured to provide a specified length between the two proximate ends, i.e., the two inner ends, of the electrodes 310, 315. The length L between the two proximate ends is proportional to the surge protection that is required, e.g., 0.050 inches will protect the tap 130 for voltage surges greater than or equal to 3 kV.

Referring to FIG. 4, the connector 305 has a cavity 330 formed therein and surrounded by material having external threads 335 that mate with existing internal threads of the access port 225 (FIG. 2) of a conventional tap 130. The threaded connector 305, which when mated to the access port 225 is physically in contact with the tap housing 220, has a mechanically, secured end plug 340 that caps the cavity 330 to block access to the inside of the threaded connector 305. Inserted into the cavity 330 of the threaded connector 305 is a spring clip assembly 345. The spring 345 is positioned between the outside portion of the second electrode 315 and the interior of the end plug 340 that then becomes a chassis ground when screwed into a tap housing 220. Additionally, the spring 345 ensures a positive connection between the outside portion of the first electrode 310 and the seizure screw 230 (FIG. 2) that is located inside the access port 225 by applying pressure on the surge-gap assembly of the electrodes 310, 315 and the insulator material 320.

Assembly of the configured surge-gap end plug 300, i.e., the spring 345, the electrodes 310, 315 and the insulator material 320 assembly, and the threaded connector 305, is depicted in FIG. 4. The configured surge-gap end plug 300 is, after assembly, mated into the tap housing access port 225 by way of screwing the threaded connector 305 into existing internal threads 370 in the access port 225.

Operationally, the surge-gap end plug 300 protects the tap 130 when a surge in voltage on the coaxial cable, determined by the ionization in the air, exceeds the arc-over voltage set by the open-air gap 325 spacing of length L. By way of example, 3 kV will exceed the arc-over voltage with an open-air gap 325 spacing of 0.050 inches. The open-air gap 325 allows the voltage to arc between the two proximate ends of the electrodes 310, 315. The electrodes 310, 315 then function as a low impedance path to the tap housing 220 ground via the spring clip assembly 345. As a result, the surge in current bypasses the circuitry of the distribution tap 130 and flows directly to ground. Power signals of predetermined levels are still allowed to pass through the tap 130, which results in the tap 130 retaining its functionality to continue receiving RF signals and providing service to the next device in the communication system 100.

Conventional spark gap devices generally contain gasses that ionize at lower voltages as opposed to the open-air gap 325 of the surge-gap end plug 300 of the present invention. The conventional spark gap devices have not proven effective in the cable television industry due to the presence of the 60VAC and 90VAC voltages that are applied to the coaxial cable of a cable television system 100. The conventional spark gaps are confined within a small, enclosed component housing, which under the IEEE (587) fault conditions may produce excessive heat. As a result, the arc may not extinguish due to the presence of 60VAC or 90VAC powering used in the cable television system amplifiers and other communication devices. Subsequently, the devices may burn and destroy the tap circuitry and any protective device that is installed. The open-air gap 325 of the present invention allows the heat to dissipate within the larger volume of the tap housing 220 and due to the higher arc-over voltage afforded by the open-air gap 325 design will assure the arc extinguishes before any devices are destroyed.

By way of example, the following design and specifications are listed that represent a prototype model of a surge-gap end plug 300 that has been configured and tested:

Electrode material is made from a soldered plated brass;

Insulator material is made of teflon;

Insulator diameter and length are 0.375 inch diameter and 0.7 inches long, respectively;

Electrode outer diameter is 0.25 inches with a length of 0.065 inches and the electrode inner diameter is 0.065 inches with a length of 0.325 inches;

Size of insulator opening is 0.2 inches;

Spring coil diameter and spring length are 0.375 inches by 0.50 inches;

Cavity diameter and length are 0.375 inches by 0.50 inches;

End plug material is made of zinc.

It will be appreciated that some of the prototype features can be modified while achieving the same specification results. For example, the insulator material 320 has been depicted as being cylindrical, when in fact, this insulator material can be of different shape as long as it is configured to fit within the tap access ports 225. The electrodes 310, 315 can be formed with a conductive material like carbon or different metals, e.g., brass, copper, silver, or iron alloys. In addition, the present invention and prototype depicts a threaded connector 305 for ease of installation and lower implementation costs, but the surge-gap device has other applications. For example, the surge-gap assembly of the electrodes 310, 315 and the insulator material 320 may press-fit into a holder or modified to be soldered onto the printed wiring board of the tap 130. It will be appreciated that these examples will afford the same voltage and current surge protection as the surge-gap end plug 300 of FIG. 3.

In summary, the surge-gap end plug 300 of the present invention is a protective device that can easily be installed externally onto conventional taps 130 that are currently installed or waiting to be deployed. These devices are economical, while also providing the advantage of protecting the tap 130 from voltage and current surges throughout the communication system 100.

What is claimed is:

1. A surge-gap device, comprising:
two electrodes each having an inner portion and an outer portion;
an insulator for partially surrounding the two electrodes, the insulator having an open-air gap that is formed in a central region thereof and that separates the inner portions of the electrodes, wherein the insulator has an opening formed therethrough and into which the inner portions of the electrodes extend; and
a fastener for electrically coupling the surge-gap device to a ground plane of an external electrical device for directing excess current to the ground plane and thereby suppressing voltage surge.

2. The surge-gap device of claim 1, wherein the two electrodes and the insulator comprise a subassembly of the surge-gap device.

3. The surge-gap device of claim 1, wherein the open-air gap has a length L that is defined by a space between the inner portions of the two electrodes allowing, in the event of a voltage surge, an arc path for excess current.

4. The surge-gap device of claim 2, wherein the fastener is configured to define a cavity therein, and wherein the fastener further comprises:
threads formed on its exterior;
an opening at one end of the fastener for inserting the subassembly into the cavity; and
an end plug at a second end of the fastener that defines a boundary of the cavity to secure the subassembly therein.

5. The surge-gap device of claim 4, further comprising a spring, wherein the spring is positioned in the cavity between the end plug and the outside portion of one electrode of the subassembly.

6. The surge-gap device of claim 1, wherein:
the inner portions of the electrodes each have a first diameter selected to minimize inherent capacitance and to allow the current surge to pass between the two electrodes; and
the outer portions of the electrodes each have a second diameter larger than the first diameter, wherein the second diameter is sized to secure the two electrodes in the insulator and to form a connection point between the outer portion and the spring.

7. A tap for splitting signals, the tap comprising:
a tap housing having at least one access port, wherein the access port is configured to have a cavity therein, and wherein the access port comprises:
conducting means for contacting tap circuitry; and
a surge-gap device coupled to the access port to protect the tap against voltage and current surges, the surge-gap device comprising:
two electrodes each having an inner portion and an outer portion;
an insulator for partially surrounding the two electrodes, the insulator having an open-air gap that is formed in a central region thereof and that separates the inner portions of the electrodes, wherein the insulator has an opening formed therethrough and into which the inner portions of the electrodes extend; and
a fastener for electrically coupling the surge-gap device to the tap housing and for directing excess current, during voltage surges, from the tap circuitry to the tap housing via the surge-gap device and the conducting means.

8. The tap of claim 7, wherein the open-air gap has a length L that is defined by a space between the inner portions of the two electrodes allowing, in the event of a voltage surge, an arc path for excess current surge.

9. The tap of claim 7, wherein the two electrodes and the insulator comprise a subassembly of the surge-gap device.

10. The tap of claim 7, wherein the fastener is configured to define a cavity therein, and wherein the fastener further comprises:
threads formed on its exterior to mate with corresponding threads of the access port;
an opening at one end of the fastener for inserting the subassembly; and
an end plug at a second end of the fastener that defines a boundary of the cavity to secure the subassembly therein.

11. The tap of claim 7, further comprising a spring, wherein the spring is positioned in the cavity between the end plug and the outside portion of one electrode of the subassembly.

12. The spring of claim 11, wherein the spring exerts pressure onto the subassembly, forcing contact between the outside portion of the second electrode and the conducting means.

13. The tap of claim 7, wherein:
the inner portions of the electrodes each have a first diameter selected to minimize inherent capacitance and to allow the current surge to pass between the two electrodes; and
the outer portions of the electrodes each have a second diameter larger than the first diameter, wherein the second diameter is sized to secure the two electrodes in the insulator, and wherein the second diameters of the two electrodes are sized to form a connection point to the spring and sized to form a connection point to the conducting means.

14. A tap for splitting signals, the tap comprising:

a tap housing having at least one access port, wherein the access port is configured to define a cavity therein, and wherein the access port further comprises:

conducting means for contacting tap circuitry; and a surge-gap device coupled to the access port to protect the tap against excess voltage and current surges, the surge-gap device comprising:

a fastener configured to define a cavity therein and to mate with the access port;

a subassembly situated within the cavity of the fastener, wherein the subassembly comprises:

two electrodes each having an inner portion and an outer portion; and an insulator for securing the two electrodes and to center the two electrodes about the same longitudinal axis, the insulator having an open-air gap that is formed in a central region thereof and that separates the inner portions of the two electrodes, and wherein the insulator has an opening formed therethrough into which the inner portions of the electrodes extend; and a spring situated within the cavity of the fastener between a bottom surface of the cavity and the subassembly for forcing the subassembly into contact with the conducting means of the access port when the fastener is mated with the access port.

15. The tap of claim 14, wherein:

the inner portions of the two electrodes each have a diameter of 0.065 inches and a length of 0.325 inches; and the outer portions of the two electrodes each have a diameter of 0.375 inches and a length of 0.7 inches.

16. The tap of claim 15, wherein the insulator is formed from teflon.

17. The tap of claim 15, wherein the opening formed in the insulator has a diameter of 0.2 inches.

18. The tap of claim 15, wherein the cavity formed within the fastener has a diameter of 0.375 inches and a length measured within the cavity to the bottom surface of 0.50 inches.

* * * * *

UNITED STATES PATENT AND TRADEMARK OFFICE
CERTIFICATE OF CORRECTION

PATENT NO. : 6,473,285 B1
DATED : October 29, 2002
INVENTOR(S) : Schlenz et al.

It is certified that error appears in the above-identified patent and that said Letters Patent is hereby corrected as shown below:

Column 4,
Line 58, delete "bum" and insert therefore -- burn --.

Signed and Sealed this

Twenty-fifth Day of March, 2003

JAMES E. ROGAN
*Director of the United States Patent and Trademark Office*